US012558642B2

(12) United States Patent
Fujimoto et al.

(10) Patent No.: US 12,558,642 B2
(45) Date of Patent: Feb. 24, 2026

(54) VALVE DEVICE

(71) Applicant: KAWASAKI JUKOGYO KABUSHIKI KAISHA, Kobe (JP)

(72) Inventors: Yoshiteru Fujimoto, Kobe (JP); Hiroshi Yamashita, Kobe (JP); Masataka Higashiura, Kobe (JP); Tsutomu Tomita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/721,825

(22) PCT Filed: Dec. 21, 2022

(86) PCT No.: PCT/JP2022/047238
§ 371 (c)(1),
(2) Date: Jun. 19, 2024

(87) PCT Pub. No.: WO2023/127664
PCT Pub. Date: Jul. 6, 2023

(65) Prior Publication Data
US 2024/0350959 A1 Oct. 24, 2024

(30) Foreign Application Priority Data
Dec. 28, 2021 (JP) ................................. 2021-214225

(51) Int. Cl.
B01D 46/00 (2022.01)
B01D 46/10 (2006.01)
(Continued)

(52) U.S. Cl.
CPC ..... B01D 46/4272 (2013.01); B01D 46/0002 (2013.01); B01D 46/10 (2013.01); F16K 51/00 (2013.01)

(58) Field of Classification Search
CPC . F16K 51/00; B01D 46/4272; B01D 46/0002; B01D 46/10; B01D 46/106
See application file for complete search history.

(56) References Cited

U.S. PATENT DOCUMENTS

| | | | | | |
|---|---|---|---|---|---|
| 4,451,364 | A | * | 5/1984 | Higgins | ............. G01N 30/6026 |
| | | | | | 285/109 |
| 4,664,800 | A | * | 5/1987 | Raines | ................... B01D 29/01 |
| | | | | | 604/126 |

(Continued)

FOREIGN PATENT DOCUMENTS

JP      2017102581 A      6/2017

*Primary Examiner* — Kelsey E Cary
(74) *Attorney, Agent, or Firm* — Alleman Hall LLP

(57) ABSTRACT

A valve device includes a first member having a recess section where a first opening of a first flow channel opens; a second member having a protruding section having an end part formed with a second opening of a second flow channel, the protruding section being inserted into the recess section such that the first opening is opposed to the second opening; a filter having a thickness in a predetermined direction, located between the first opening and the second opening; and a retainer having a body part retaining the filter inside, and at least two attachment parts formed on one side of a predetermined direction of the body part and attached to the protruding section.

8 Claims, 7 Drawing Sheets

(51) Int. Cl.
B01D 46/42 (2006.01)
F16K 51/00 (2006.01)

(56) References Cited

U.S. PATENT DOCUMENTS

| | | | | |
|---|---|---|---|---|
| 6,547,255 | B1 * | 4/2003 | Donaway | F16L 19/0212 |
| | | | | 277/626 |
| 7,673,653 | B2 * | 3/2010 | Mijers | F16L 29/00 |
| | | | | 137/859 |
| 8,919,680 | B2 | 12/2014 | Grether | |
| 2012/0311981 | A1 * | 12/2012 | Lin | B01D 46/0002 |
| | | | | 55/499 |

* cited by examiner

VALVE DEVICE

TECHNICAL FIELD

The present invention relates to a valve device including a filter that captures contamination.

BACKGROUND ART

A valve device is provided with a filter so as to capture contamination. For example, in the valve device described in PTL 1, a filter is inserted into a recess part of the body. The filter is pushed against the body by a metal bush (retainer).

CITATION LIST

Patent Literature

PTL 1: Japanese Laid-Open Patent Application Publication No. 2017-102581

SUMMARY OF INVENTION

Technical Problem

In the valve device of PTL 1, it is difficult to dispose the filter at a predetermined position or posture, and the installing operation of the filter is complicated.

In light of this, it is an object of the present invention to provide a valve device capable of facilitating the installation of the filter.

Solution to Problem

The valve device of the present invention include: a first member having a recess section where a first opening of a first flow channel opens; a second member having a protruding section having an end part formed with a second opening of a second flow channel, the protruding section being inserted into the recess section such that the first opening is opposed to the second opening; a filter having a thickness in a predetermined direction, located between the first opening and the second opening; a retainer having a body part retaining the filter inside, and at least two attachment parts formed on one side of a predetermined direction of the body part and attached to the protruding section.

According to the present invention, it is possible to attach the filter to the second member by the retainer. Therefore, in assembling the valve device, it is possible to dispose the filter inside the recess section, and also dispose between the protruding section and the recess section by inserting the protruding section of the second member into the recess section of the first member. Therefore, the filter is easy to install.

Advantageous Effects of Invention

According to the present invention, it is possible to facilitate the installation of the filter.

The above objects, other objects, features, and merits of the present invention will be apparent from the following detailed description of preferred embodiments with reference to attached drawings.

DESCRIPTION OF EMBODIMENTS

Hereinafter, valve devices 1, 1A to 1C of Embodiment 1 to Embodiment 4 according to the present invention are described by referring to the aforementioned drawings. The concept of the direction used in the following description is merely used for convenience in description, and should not be understood to limit the orientation or the like of the configuration of the invention to the described direction. The valve devices 1, 1A to 1C described below each are merely one embodiment of the present invention. Therefore, the present invention is not limited to the embodiments, but addition, deletion, and modification can be made without departing from the scope of the invention.

Embodiment 1

Figure 1:
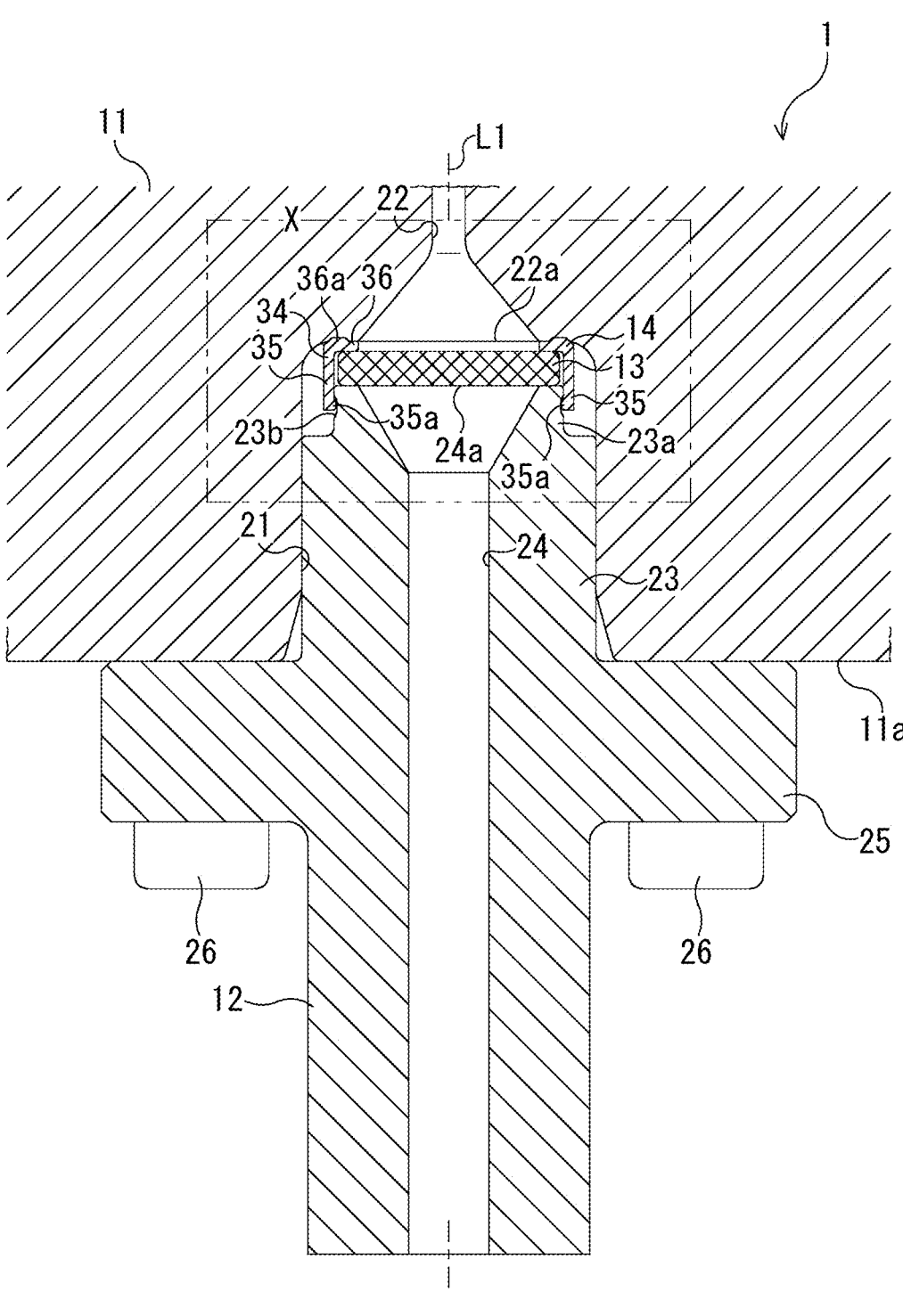
FIG. 1 is a sectional view showing a valve device according to Embodiment 1 of the present invention.

As shown in FIG. 1, the valve device 1 of Embodiment 1 controls the flow of the working fluid in the valve device 1. For example, the valve device 1 controls at least one of the flow rate, the pressure, and the flowing direction of the working fluid. The working fluid of which flow is controlled by the valve device 1 is gas, and in the present embodiment, the working fluid is hydrogen gas. More specifically, the valve device 1 includes a casing 11, a housing 12, a filter 13 and a retainer 14.

Casing

Figure 2:
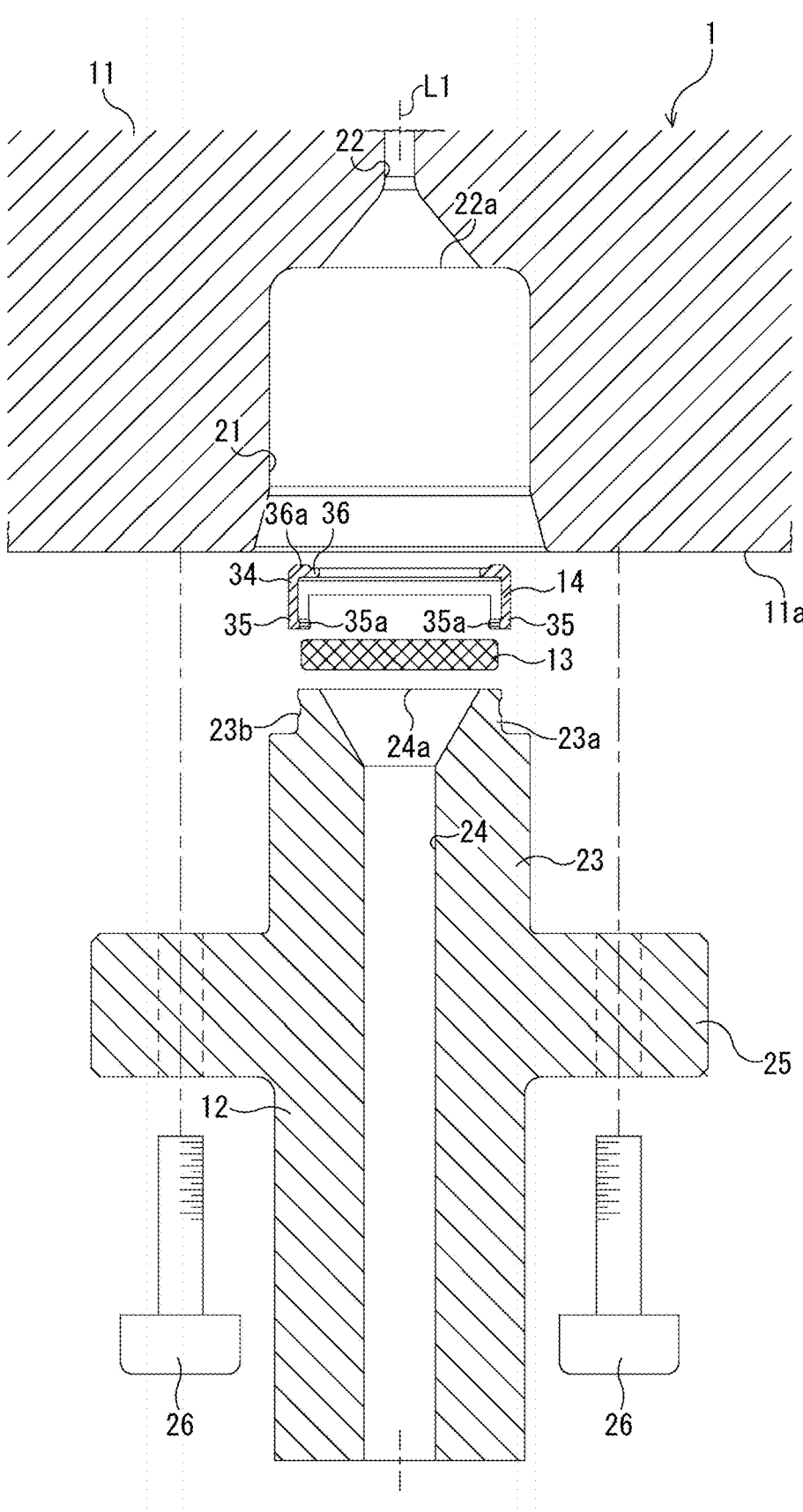
FIG. 2 is an exploded view showing the valve device of FIG. 1 in an exploded manner.

The casing 11 which is one example of the first member has a recess section 21 as shown in FIG. 2. To the recess section 21, a first opening 22a of a first flow channel 22 opens. More specifically, the recess section 21 is formed in an outer surface 11a of the casing 11. The recess section 21 is formed around a predetermined axial line L1, and opens on one side in the axial direction along the axial line L1. The first flow channel 22 is formed in the casing 11, and has the first opening 22a. The first opening 22a is formed on the bottom part of the recess section 21, and the first flow channel 22 connects to the recess section 21 via the first opening 22a. Also, the first flow channel 22 increases in diameter as it approaches the first opening 22a. It is to be noted that the first flow channel 22 does not necessarily increase in diameter as it approaches the first opening 22a.

Also, at least one valve body (not shown) is provided in the casing 11. The valve body constitutes a valve with the casing 11, and controls the flow of hydrogen gas flowing through the first flow channel 22. Examples of the valve include a pressure reducing valve, a flow control valve, a check valve, a safety valve, and a manual valve. However, the valve is not limited to these valves.

Furthermore, the casing 11 is formed of metal. In the present embodiment, the casing 11 is formed of metal having resistance to hydrogen embrittlement, and is for example, formed of aluminum. It is to be noted that the casing 11 may be made of stainless steel without being limited to aluminum.

Housing

The housing 12 which is one example of the second member has a protruding section 23. And in an end part 23*a* of the protruding section 23, a second opening 24*a* of a second flow channel 24 is formed. Here, the end part 23*a* of the protruding section 23 is an end part on the other side in the axial direction in the housing 12. The protruding section 23 of the housing 12 is inserted into the recess section 21. And, the housing 12 is disposed in such a manner that the second opening 24*a* is opposed to the first opening 22*a*. Thus, the second flow channel 24 and the first flow channel 22 are connected with each other, resulting that hydrogen gas can flow between the first flow channel 22 and the second flow channel 24. To be more specific, the housing 12 is formed into a cylindrical shape having an axial line coincident with the axial line L1. The housing 12 has a flange 25 and the second flow channel 24.

The flange 25 is formed in an intermediate part in the axial direction of the housing 12. More specifically, the flange 25 is formed over the entire periphery in the circumferential direction in the intermediate part in the axial direction, and protrudes in the radial direction. And, the protruding section 23 forms the part on the other side in the axial direction from the flange 25 in the housing 12. The protruding section 23 is inserted into the recess section 21 such that the axial line of the housing 12 coincides with the axial line L1. And, in the housing 12, a fastening member 26 (for example, bolt) inserted through the flange 25 is inserted, and the flange 25 is fastened to the casing 11 by the fastening member 26. However, the method of fixing the housing 12 to the casing 11 is not limited to fastening, and may be welding, screwing or the like. In this manner, the housing 12 is attached to the casing 11.

In the protruding section 23, the end part 23*a* has a smaller diameter compared with the part on one side in the axial direction than the end part 23*a*. Also, on the outer peripheral surface of the end part 23*a*, an engaging groove 23*b* is formed. With the engaging groove 23*b* which is one example of an engaging recess, a later-described projecting part 35*a* engages. The engaging groove 23*b* is formed over the entire circumference in the outer peripheral surface of the end part 23*a* in the present embodiment. It is to be noted that the engaging groove 23*b* is not necessarily formed on the entire circumference, and may be formed at a position corresponding at least to the later-described projecting part 35*a*.

The second flow channel 24 is formed as an inner hole of the housing 12. More specifically, the second flow channel 24 penetrates the housing 12 along the axial line L1, and has the second opening 24*a* on the other side in the axial direction. That is, the second opening 24*a* is formed in the end part 23*a* of the protruding section 23. And, the second opening 24*a* opens on one side in the axial direction. In the present embodiment, the second flow channel 24 increases in diameter in the vicinity of the second opening 24*a*. It is to be noted that also the second flow channel 24 does not necessarily increase in diameter as it approaches the second opening 24*a*. Also, the housing 12 is an input port housing in the present embodiment, and hydrogen gas is introduced into the second flow channel 24 from the end part on the other side in the axial direction of the housing 12.

Further, the housing 12 is formed of metal. In the present embodiment, the housing 12 is formed of metal having resistance to hydrogen embrittlement, and formed, for example, of stainless steel. It is to be noted that the housing 12 may be formed of aluminum without limited to stainless steel.

Filter

Figure 4:
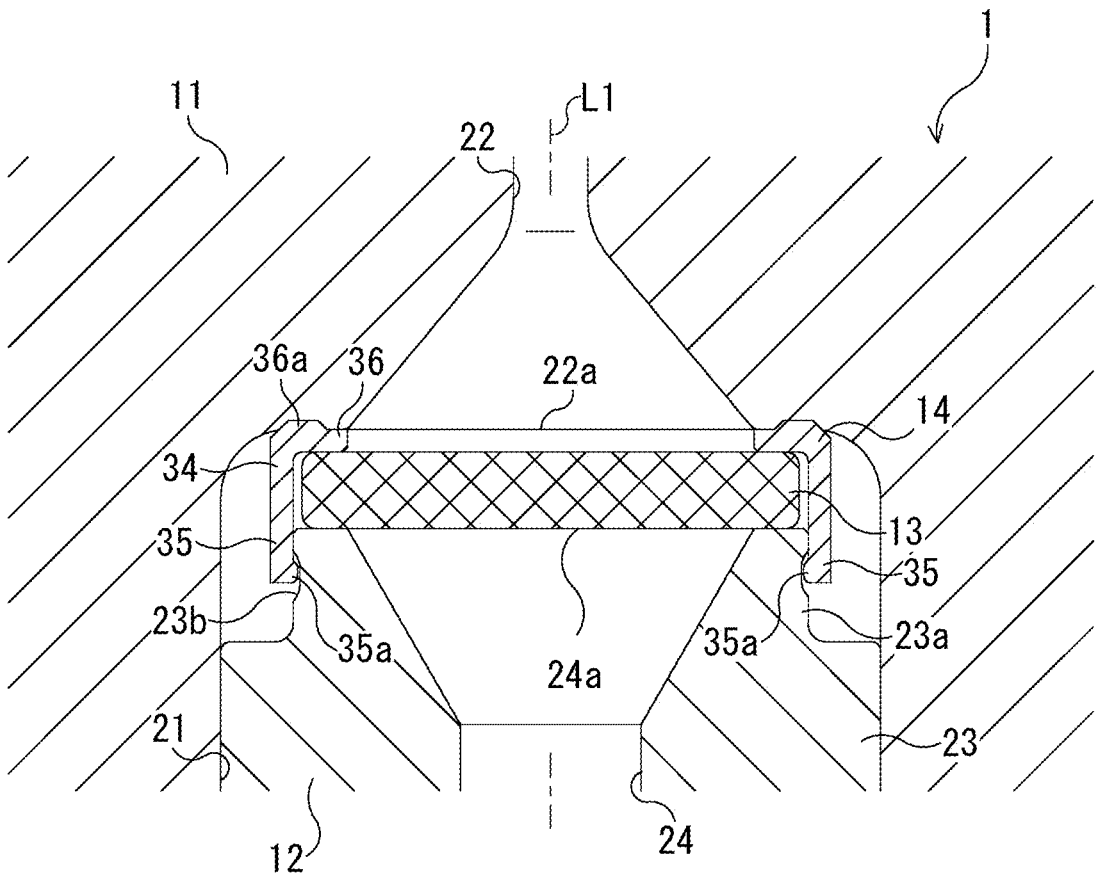
FIG. 4 is an enlarged sectional view showing a region X of the valve device of FIG. 1 in an enlarged manner.

The filter 13 has a thickness in a predetermined direction. In the present embodiment, the predetermined direction coincides with the axial direction described above. In the present embodiment, the filter 13 is formed, for example, into a plate, and is formed into a disc shape in the present embodiment. Also, the filter 13 is disposed to be located between the first opening 22*a* and the second opening 24*a*. And, the filter 13 captures contamination contained in the hydrogen gas flowing between the first flow channel 22 and the second flow channel 24. More specifically, the filter 13 is in contact with an end surface on the other side in the axial direction of the protruding section 23 of the housing 12 (hereinafter, simply referred to as "end surface of the protruding section 23") as shown in FIG. 4. And, the filter 13 is formed to have a diameter larger than the pore diameter of the second opening 24*a*. Therefore, the entire second opening 24*a* is covered with the filter 13 from the other side in the axial direction. Thus, the hydrogen gas discharged from the second opening 24*a* passes through the filter 13, and the filter 13 captures contamination contained in the hydrogen gas. The filter 13 is formed to have a diameter larger than the pore diameter of the first opening 22*a* in the present embodiment.

Retainer

Figure 3:
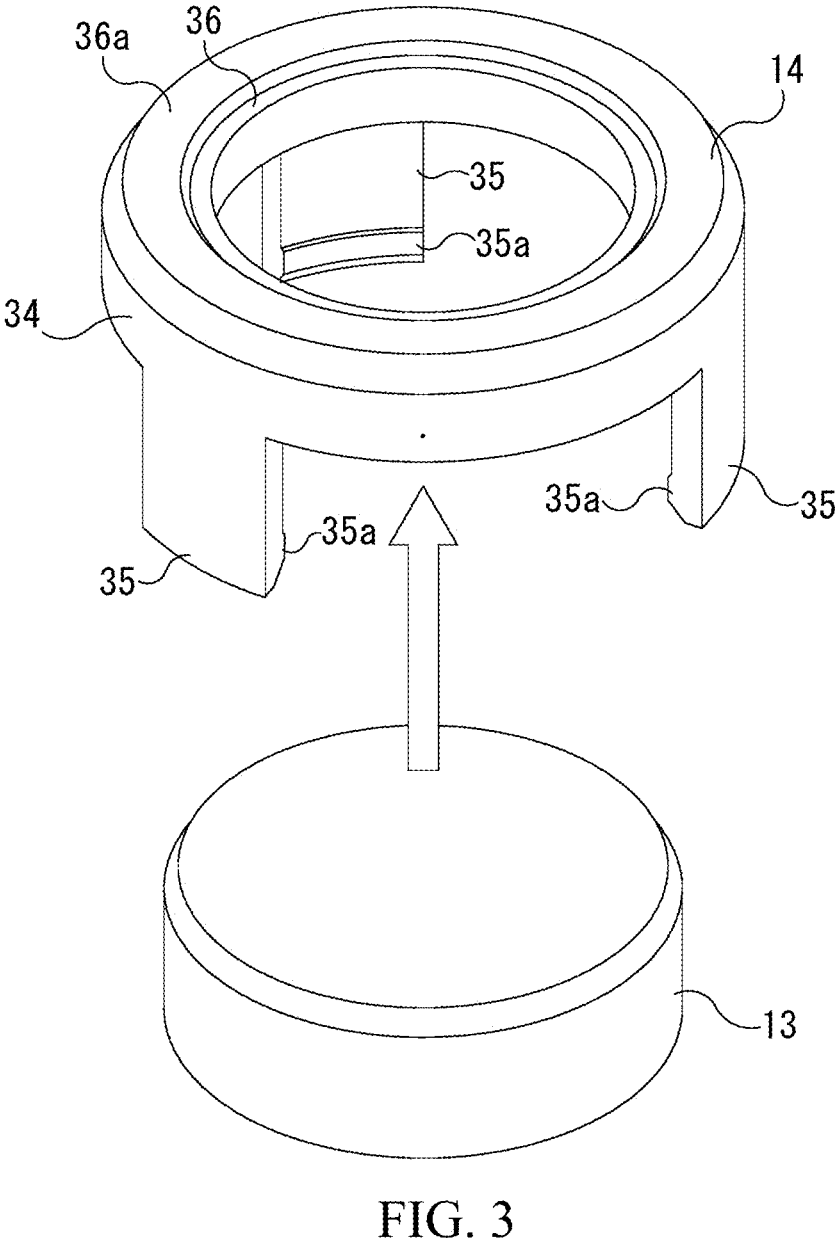
FIG. 3 is an enlarged perspective view showing the filter and the retainer of FIG. 2 in an enlarged manner.

As shown in FIG. 3, the retainer 14 has a body part 34, an attachment part 35, and an inner extension part 36. The retainer 14 is attached to the protruding section 23 of the housing 12 and retains the filter 13 inside. Thus, the filter 13 is fixed to the end surface on the other side in the axial direction of the protruding section 23 such that it covers the entire second opening 24*a*. Also, the retainer 14 is formed of a material that is softer than aluminum. That is, the retainer 14 is formed of a material having lower hardness than aluminum. In the present embodiment, the retainer 14 is formed of a resin material. It is to be noted that the retainer 14 is not limited to those made of a resin material.

Body Part

The body part 34 retains the filter 13 inside. More specifically, the body part 34 is formed into a hollow disc shape. The body part 34 is formed to have an inner hole having a diameter of the same or slightly larger than the outer diameter of the filter 13. In the present embodiment, the inner hole of the body part 34 is formed to have a diameter larger than the outer diameter of the filter 13. And, the filter 13 is retained inside the body part 34.

Attachment Part

The attachment part 35 is formed on one side in the axial direction of the body part 34. And, the attachment part 35 is attached to the protruding section 23. More specifically, a plurality of attachment parts 35 are formed in the body part 34. In the present embodiment, three attachment parts 35 are formed in the body part 34. The number of attachment parts 35 is not limited to three, but may be two or four or more. In FIG. 2 and FIG. 4, the attachment parts 35 are arranged at regular intervals in the circumferential direction in the body part 34. In FIG. 1, FIG. 2 and FIG. 4, the position of the attachment part 35 is altered for convenience of description. Also, the attachment part 35 extends on one side in the axial direction from the body part 34, and the distal end of the attachment part 35 reaches the engaging groove 23*b*.

Also, the attachment part 35 has the projecting part 35*a* that projects inwardly. More specifically, the projecting part 35*a* is formed at the position corresponding to the engaging groove 23b, and is fit in and engaged with the engaging groove 23b. In the present embodiment, the projecting part 35a is formed in a distal end part, namely in one end part in the axial direction of the attachment part 35.

Inner Extension Part

The inner extension part 36 extends inwardly from the body part 34. And, the inner extension part 36 is provided on the other side in the axial direction of the filter 13. More specifically, the inner extension part 36 covers the entire outer peripheral edge in the surface on the other side in the axial direction of the filter 13. More specifically, the inner extension part 36 is formed over the entire periphery in the circumferential direction in the open end on the other side in the axial direction of the body part 34, and extends radially inwardly from the open end. The inner extension part 36 is formed into an annular shape in the present embodiment. The opening of the inner extension part 36 is formed to have the same diameter as the first opening 22a and the second opening 24a in the present embodiment. As a result, it is possible to reduce the pressure loss of hydrogen gas.

Also, in the inner extension part 36, a projection part 36a is formed. The projection part 36a projects toward the casing 11 (namely, on the other side in the axial direction) in the inner extension part 36. Also, the projection part 36a is formed in an annular shape to surround the inner peripheral edge of the inner extension part 36. In the present embodiment, the projection part 36a is formed into an annular shape, and the projection part 36a is pushed against the casing 11. More specifically, the projection part 36a is pushed against the bottom part of the recess section 21. Accordingly, the circumference of the first opening 22a is sealed by the projection part 36a. Thus, it is possible to further prevent contamination from passing through between the inner extension part 36 and the casing 11, and flowing into the first flow channel 22.

Assembly of Valve Device

The valve device 1 is assembled, for example, in the following manner. That is, the filter 13 is placed on the end surface of the protruding section 23 of the housing 12. Next, the retainer 14 is overlaid on the end part 23a of the protruding section 23 of the housing 12 such that the retainer 14 accommodates the filter 13 inside. More specifically, the retainer 14 is overlaid on the protruding section 23 such that the retainer 14 sandwiches the outer peripheral edge of the filter 13 on the end surface of the protruding section 23 of the housing 12 with the protruding section 23. And, the projecting part 35a of the attachment part 35 of the retainer 14 is engaged with the engaging groove 23b. Thus, the filter 13 is attached to the housing 12.

After attachment, the housing 12 is inserted at the protruding section 23 into the recess section 21. And, the housing 12 is pushed in to the position where the retainer 14 comes into contact with the bottom part of the recess section 21. Accordingly, the projection part 36a comes into contact with the bottom part of the recess section 21 to seal around the first opening 22a. Also, by being pushed in, the retainer 14 receives a reaction force, and the outer peripheral edge part of the filter 13 is sandwiched by the inner extension part 36 and the protruding section 23. Thus, the retainer 14 can stably retain the filter 13. Also, by sandwiching the outer peripheral edge part of the filter 13, it is possible to dispose the filter 13 around the second opening 24a, and it is possible to enhance the ability to capture contamination. After pushing-in, the housing 12 is fastened to the casing 11 by the fastening member 26 inserted through the flange 25. Thus, the housing 12 is attached to the casing 11.

In the valve device 1 configured as described above, it is possible to retain the filter 13 to the housing 12 by the retainer 14. Therefore, in assembling the valve device 1, by inserting the protruding section 23 of the housing 12 into the recess section 21 of the casing 11, it is possible to dispose the filter 13 inside the recess section 21, and dispose the filter 13 between the protruding section 23 and the recess section 21. Therefore, it is possible to facilitate the installation of the filter 13. Also, in the valve device 1, a snap fit is formed by the attachment part 35 and the engaging groove 23b. Therefore, it is possible to easily attach the retainer 14 to the protruding section 23. Accordingly it is possible to further facilitate the installation of the filter 13.

Embodiment 2

The valve device 1A of Embodiment 2 resembles the valve device 1 of Embodiment 1 in configuration. Therefore, the configuration of the valve device 1A of Embodiment 2 is described mainly about the point different from that of the valve device 1 of Embodiment 1, and the same configuration is denoted by the same reference numeral, and the description is omitted. The same applies also to the valve devices 1B, 1C of Embodiments 3 and 4.

Figure 5:
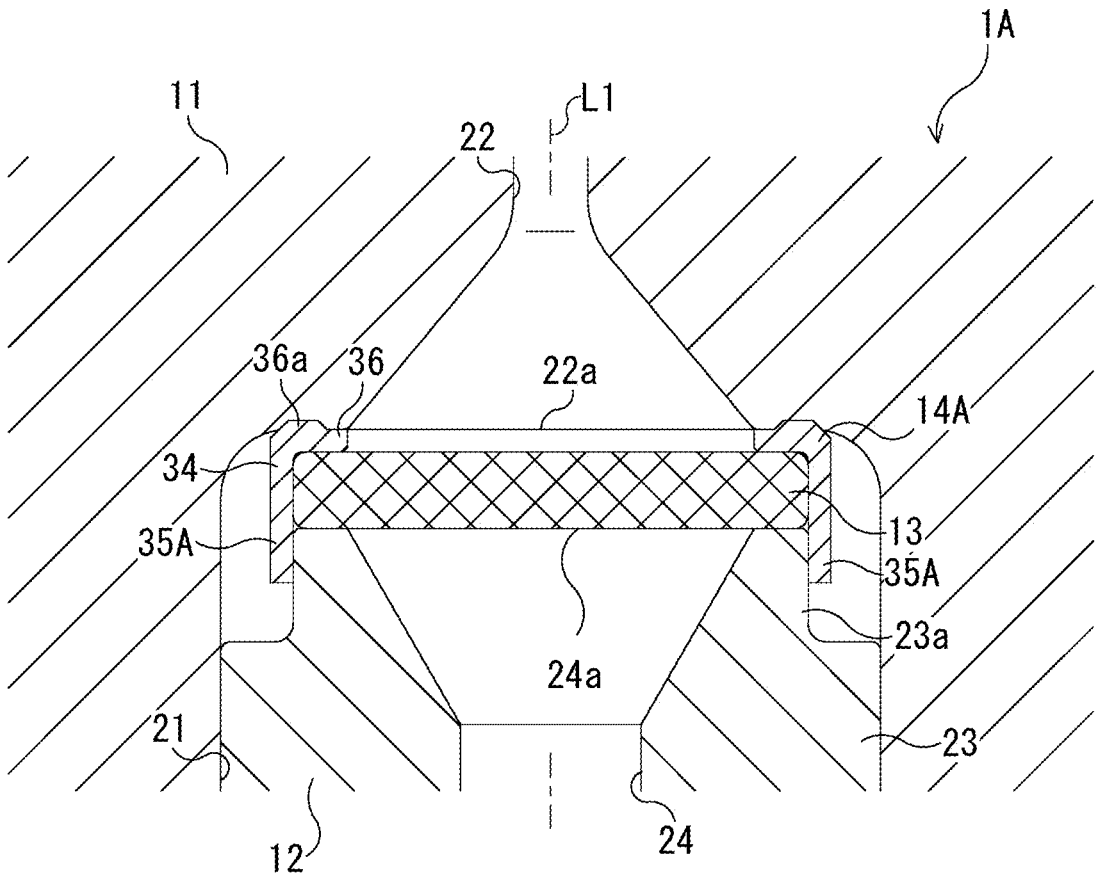
FIG. 5 is an enlarged sectional view showing a part of the valve device of Embodiment 2 of the present invention in an enlarged manner.

As shown in FIG. 5, the valve device 1A has the casing 11, the housing 12, the filter 13, and a retainer 14A. The retainer 14A has the body part 34, an attachment part 35A, and the inner extension part 36.

The attachment part 35A is formed to surround the outer peripheral surface of the protruding section 23. More specifically, the attachment part 35A is formed on one side in the axial direction of the body part 34. Also, a plurality of attachment parts 35 are formed in the body part 34. In the present embodiment, three attachment parts 35A are formed in the body part 34. The number of attachment parts 35A may be four or more. And, the attachment parts 35 are arranged at regular intervals in the circumferential direction in the body part 34. In FIG. 5, the position of the attachment part 35A is altered for convenience of description. The attachment part 35A extends straight on one side in the axial direction. Also, the inner peripheral surface of the attachment part 35A is curved, and formed to have a radius of curvature of smaller than the outer diameter of the protruding section 23.

In the retainer 14A configured as described above, the protruding section 23 is fitted between the plurality of attachment parts 35A. More specifically, the protruding section 23 is press-fitted between the plurality of attachment parts 35A. Thus, the filter 13 is attached to the housing 12. In the valve device 1A, it is possible to attach the retainer 14A to the protruding section 23 by press-fitting the protruding section 23 into the attachment parts 35A, and thus it is possible to easily attach the retainer 14 to the protruding section 23. Accordingly it is possible to further facilitate the installation of the filter 13.

Besides the above, the valve device 1A of Embodiment 2 achieves the equivalent operation and effect as the valve device 1 of Embodiment 1.

Embodiment 3

Figure 6:
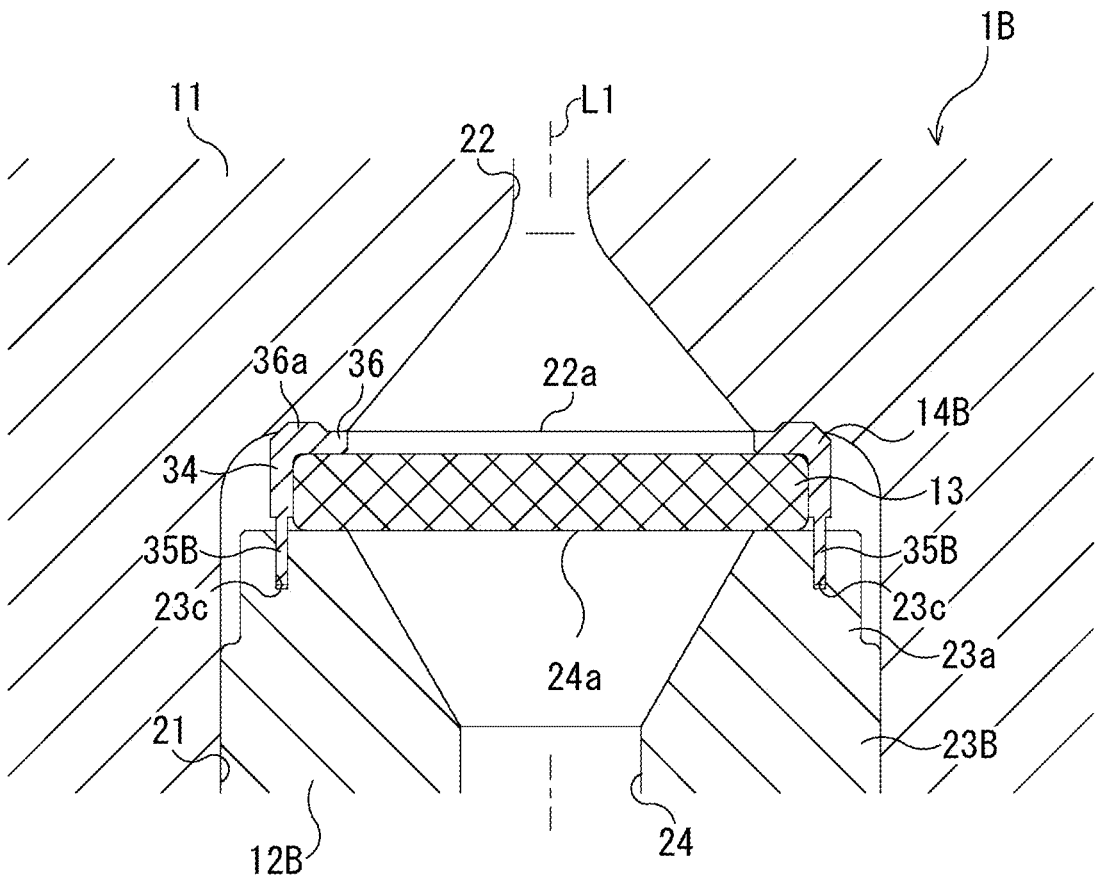
FIG. 6 is an enlarged sectional view showing a part of the valve device of Embodiment 3 of the present invention in an enlarged manner.

The valve device 1B of the Embodiment 3 includes the casing 11, a housing 12B, the filter 13, and a retainer 14B as shown in FIG. 6. The housing 12B has a protruding section 23B. On the end surface of the protruding section 23B, a plurality of fitting holes 23c are formed around the second opening 24a. The fitting holes 23c extend on one side in the axial direction. In the present embodiment, three fitting holes 23c are formed on the end surface of the protruding section 23B. It is to be noted that the number of fitting holes 23c may be two or four or more. Then, the fitting holes 23c are arranged at regular intervals about the axial line L1 around the second opening 24a.

The retainer 14B has the body part 34, an attachment part 35B, and the inner extension part 36. The attachment part 35B is fitted with the corresponding fitting hole 23c. More specifically, the attachment part 35B is formed on one side in the axial direction of the body part 34. Also, the same number of attachment parts 35B as the number of fitting holes 23c are formed in the body part 34. That is, in the body part 34, three attachment parts 35B are formed in the present embodiment. The number of attachment parts 35B may be two or four or more. And, each of the attachment parts 35B is arranged in correspondence with each of the fitting holes 23c. In the present embodiment, the attachment parts 35B are arranged at regular intervals in the circumferential direction in the body part 34. In FIG. 6, the position of the attachment part 35B is altered for convenience of description. Also, the attachment part 35A extends straight on one side in the axial direction. And, each of the attachment parts 35A is formed press-fittably in correspondence with each of the fitting holes 23c.

The retainer 14B configured in this manner is overlaid on the second opening 24a while each of the attachment parts 35B is press-fit into the corresponding fitting hole 23c. Thus, the filter 13 is attached to the housing 12. In the valve device 1A, it is possible to attach the retainer 14B to the protruding section 23 by inserting and fitting the attachment parts 35B into the fitting holes 23c, and thus it is possible to easily attach the retainer 14B to the protruding section 23. Accordingly it is possible to further facilitate the installation of the filter 13.

The valve device 1B of Embodiment 3 achieves the equivalent operation and effect as the valve device 1 of Embodiment 1.

Embodiment 4

Figure 7:
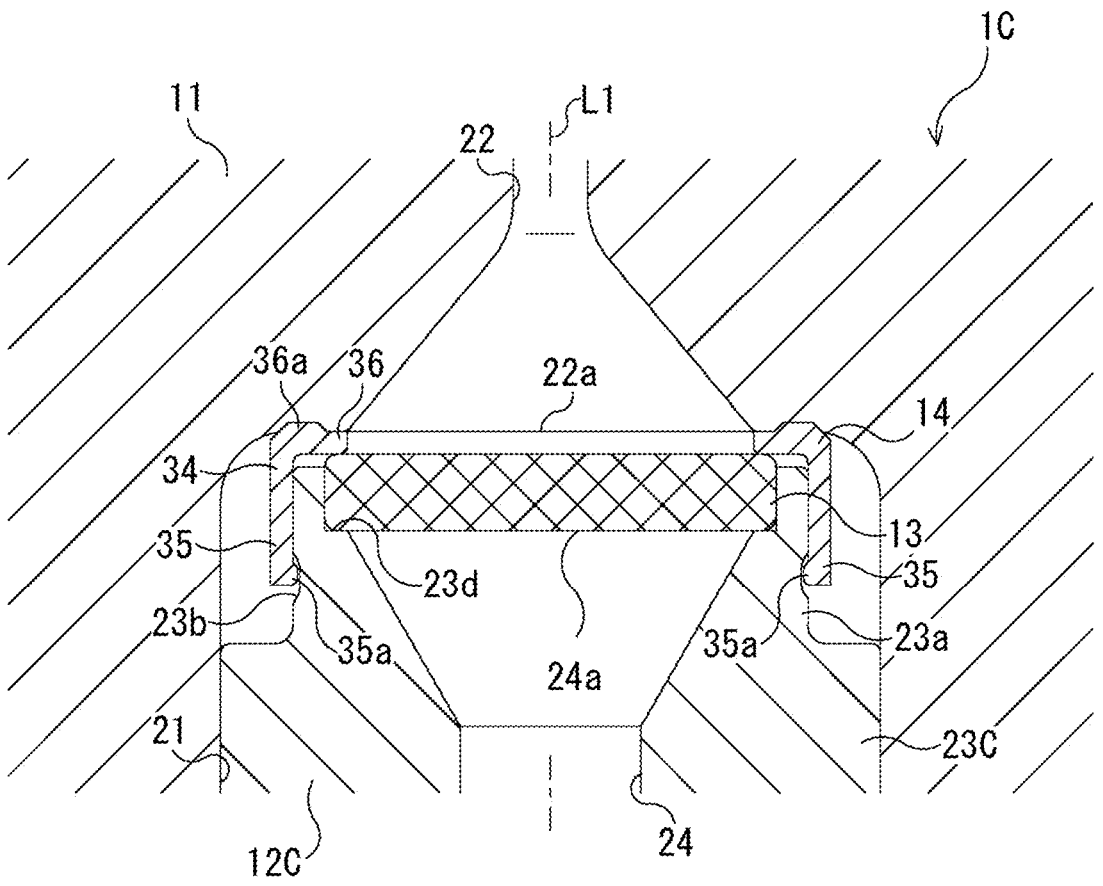
FIG. 7 is an enlarged sectional view showing a part of the valve device of Embodiment 4 of the present invention in an enlarged manner.

The valve device 1C of Embodiment 4 includes the casing 11, a housing 12C, the filter 13, and the retainer 14 as shown in FIG. 7. The housing 12C has a protruding section 23C. And, the protruding section 23C has a counter bore 23d the end part 23a. The counter bore 23d is formed around the second opening 24a in the end part 23a. More specifically, the counter bore 23d is formed to be recessed on one side in the axial direction from the end surface of the protruding section 23C. And, the second opening 24a opens in the bottom surface of the counter bore 23d. Therefore, the second opening 24a faces the first opening 22a with the counter bore 23d interposed therebetween. In the present embodiment, the counter bore 23d is formed to have a circular cross section centered at the axial line L1, and is formed to have a larger diameter than the second opening 24a and the first opening 22a. It is to be noted that the shape of the counter bore 23d is not limited to the shape described above.

The filter 13 is attached to the protruding section 23C such that at least a part of the filter 13 is fit into the counter bore 23d. Thus, the entire second opening 24a is covered with the filter 13 from the other side in the axial direction. Also, the retainer 14 is attached to cover the end part 23a of the protruding section 23C. Thus, the filter 13 is sandwiched by the retainer 14 and the counter bore 23d of the protruding section 23C, and the retainer 14 retains the filter 13 inside.

In the valve device 1C of Embodiment 4 configured as described above, since the filter 13 is disposed to be fit into the counter bore 23d, it is possible to restrict the motion in the direction intersecting the axial direction. Thus, it is possible to prevent the filter 13 from being disposed at a position deviated from the predetermined position.

The valve device 1C of Embodiment 4 achieves the equivalent operation and effect as the valve device 1 of Embodiment 1.

Regarding Other Embodiments

In the valve device 1, 1A to 1C of the present embodiment, an input port housing is recited as one example of the housing 12, the housing 12 may be, for example, a sheet member provided with a valve body. Also, the retainer 14, 14A, 14B is merely one example, and is only required to be attached to the protruding section 23 so as to retain the filter 13. Also, the shape of the attachment part 35, 35A, 35B is not limited to the shape as described above. Also, in the retainer 14, 14A, 14B, the inner extension part 36 is not necessarily formed. Also, the shape of the inner extension part 36 is not limited to the shape described above. A plurality of inner extension parts 36 may be formed, for example, at regular intervals on the other side in the axial direction of the body part 34, or may be formed on the other side in the axial direction of the filter 13. And, it is only required that the inner extension part 36 is capable of supporting preferably the filter 13 from the other side in the axial direction.

Various modifications and other embodiments of the present invention will be apparent to those skilled in the art from the above description. Therefore, the above description should be interpreted merely as illustration, and is provided for the purpose of indicating the best mode for carrying out the present invention to those skilled in the art. The details of the structure and/or the function can be substantially changed without departing from the spirit of the present invention.

REFERENCE CHARACTER LIST 1, 1A, 1B, 1C valve device
11 casing (first member)
12, 12B, 12C
13 filter
housing (second member)
14, 14A, 14B retainer
21 recess section
22 first flow channel
22a first opening
23, 23B, 23C protruding section
23a end part
23b engaging groove (engaging recess)
23c fitting hole
23d counter bore
24 second flow channel
24a second opening
34 body part
35 attachment part
35a projecting part
35A attachment part
35B attachment part
36 inner extension part
36a projection part

The invention claimed is:

1. A valve device comprising:

a first member having a recess section where a first opening of a first flow channel opens;

a second member having a protruding section having an end part formed with a second opening of a second flow channel, the protruding section being inserted into the recess section such that the first opening is opposed to the second opening;

a filter having a thickness in a predetermined direction, located between the first opening and the second opening; and a retainer having a body part that retains the filter inside, and at least two attachment parts formed on one side of a predetermined direction of the body part and attached to the protruding section, wherein the retainer is in contact with a bottom part of the recess section and holds the filter against the protruding section.

2. The valve device according to claim 1, wherein the retainer has an inner extension part extending inwardly from the body part, and the inner extension part is provided on the other side in the predetermined direction of the filter.

3. The valve device according to claim 2, wherein the retainer has a projection part formed in the inner extension part, the inner extension part covers an entire outer peripheral edge of a surface on the other side in the predetermined direction of the filter, and the projection part is formed into an annular shape so as to project toward the first member in the inner extension part, and surround the inner peripheral edge of the inner extension part.

4. The valve device according to claim 1, wherein at least one of the at least two attachment parts has a projecting part that projects inwardly and is formed around an outer peripheral surface of the protruding section, and the outer peripheral surface of the protruding section is formed with an engaging recess with which the projecting part engages.

5. The valve device according to claim 1, wherein at least one of the at least two attachment parts is formed around an outer peripheral surface of the protruding section, and the protruding section is fit in the at least two attachment parts.

6. The valve device according to claim 1, wherein the protruding section has a plurality of fitting holes respectively corresponding to the at least two attachment parts, formed around the second opening, and the at least two attachment parts fit in corresponding fitting holes.

7. The valve device according to claim 1, wherein the protruding section has a counter bore formed around the second opening in the end part, and the filter fits into the counter bore.

8. The valve device according to claim 1, wherein the first member is formed of aluminum, the second member is formed of stainless steel, and the retainer is formed of a material softer than aluminum.

\* \* \* \* \*